Aug. 7, 1928.  J. VOLCKHAUSEN  1,679,844

RIM NUT

Original Filed July 5, 1924

INVENTOR:
Julius Volckhausen,
By Attorneys,
Fraser, Myers & Manley

Patented Aug. 7, 1928.

1,679,844

UNITED STATES PATENT OFFICE.

JULIUS VOLCKHAUSEN, OF WEEHAWKEN, NEW JERSEY, ASSIGNOR TO A. SCHRADER'S SON, INC., OF BROOKLYN, NEW YORK, A CORPORATION OF NEW YORK.

RIM NUT.

Application filed July 5, 1924, Serial No. 724,382. Renewed January 13, 1928.

This invention relates to nuts, and particularly to those designed for use in connection with pneumatic tire valves for engaging the wheel rim or felly and drawing the valve casing inwardly to a firm seat. Such nuts are customarily made of sheet metal and in order to facilitate the operations of drawing and shaping, and also for the purpose of reducing the expense of manufacture they are made of the thinnest metal which is capable of withstanding the strains incident to their use. As heretofore made it has been customary to form the under side of each nut with a recess, into which was placed a leather washer which normally projected beyond the lower face of the nut so as to provide a frictional engaging surface for the nut. Occasionally, the pressure placed upon the washer is sufficient to distort it inwardly so that its opening becomes of less diameter than that of the valve casing over which the nut is threaded. Such distortion might also result from the swelling of the washer upon its becoming moist. This reduction of the internal diameter of the washer renders it difficult to remove the rim nut, and after removal, often makes it impossible to reapply the nut over the valve casing unless a new washer is substituted for the one so damaged.

According to the present invention the rim nut is made entirely of sheet metal, no leather washer or the like being used. A frictional engaging surface is provided on the nut by forming the lower or bottom side thereof with a lateral flange, which preferably has a raised or projecting circumferential rib on its under side, adapted to engage a wheel rim or felly. The invention also includes other features of novelty which will be hereinafter more fully described.

In the accompanying drawings wherein I have shown the preferred embodiment of my invention,—

Figure 1:
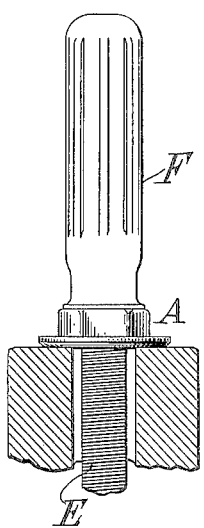
Figure 1 shows the rim nut as applied in use.
Figure 2:
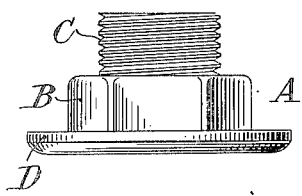
Fig. 2 is an elevation of the nut.
Figure 3:
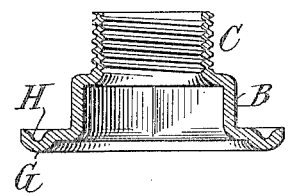
Fig. 3 is a diametrical section of the nut.
Figure 4:
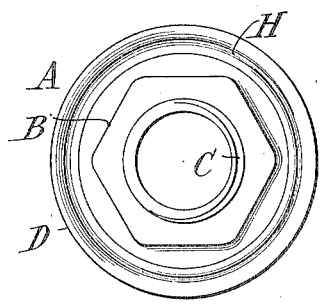
Figs. 4 and 5 are a top plan view and a bottom plan view, respectively, of Fig. 2.
Figure 5:
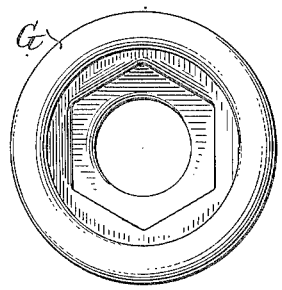

Referring to the drawings, let A indicate the rim nut as a whole, which is formed of a single sheet of metal suitably drawn and shaped to provide a body portion B, a tubular extension C, and a lateral base flange D. Preferably the body portion B is formed with an exterior wrench-engaging surface herein shown as hexagonal, for tightening the nut against a wheel rim or felly. The tubular extension C is internally screw-threaded to engage over a valve stem E and externally screw-threaded to receive a dust cap F. The nut for the purpose of economy is made of the thinnest metal which is capable of withstanding the strains incident to its use, and in order to further economize in the amount of metal employed, the external screw thread is made to overlie the internal screw thread. Said threads are preferably also of the same pitch so as to avoid weakening of the screw-threaded portion of the nut.

The lateral flange D serves to provide a frictional engaging surface for the nut and is adapted, when brought into strong frictional engagement with a wheel rim or felly, to act as a lock-nut means for preventing the unscrewing or working loose of the rim nut on the valve stem. To further increase this frictional engagement the under side of the flange is formed with a raised or projecting annular rib G which is preferably formed adjacent the circumferential edge of the flange by depressing the top of said flange to provide an annular circumferential groove H.

While I have shown and described the preferred embodiment of my invention, it will be understood that I do not wish to be limited to the exact structure disclosed, as changes therein may be made without departing from the spirit of the invention.

What I claim is:

1. A sheet metal rim nut for tire valves or the like, comprising a body portion having wrench engaging faces, a lateral flange adapted to function as a washer for the rim nut when the latter is screwed over a tire valve into engagement with a wheel felly, the felly engaging face of the flange being formed with an annular rib pressed up from the metal of the flange intermediate its edges.

2. An article of the character described, formed entirely of sheet metal, comprising a body portion provided at one end with a reduced tubular extension which is threaded both internally and externally, and at its other end with a lateral flange adapted to function as a washer, the engaging face of said flange being formed with an annular rib pressed up from the metal of the flange.

3. A device of the character described formed entirely of sheet metal, comprising a polygonal body portion provided at one end with a reduced tubular extension internally threaded to engage over a valve stem or the like and externally threaded to receive a dust cap, and at its other end with a lateral flange one face of which is adapted to engage a wheel rim, and said face being formed with an annular rib.

In witness whereof, I have hereunto signed my name.

JULIUS VOLCKHAUSEN.